Feb. 5, 1946.   J. H. HOERN   2,394,177
COOLANT CONTAINED VALVE
Filed May 13, 1944
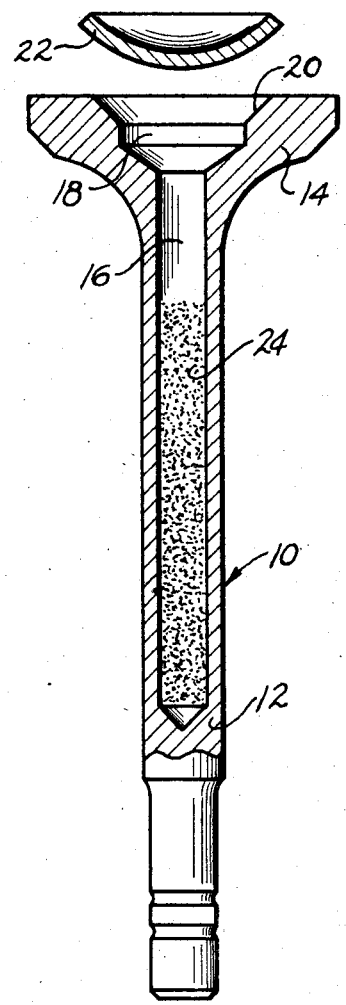
Fig_1
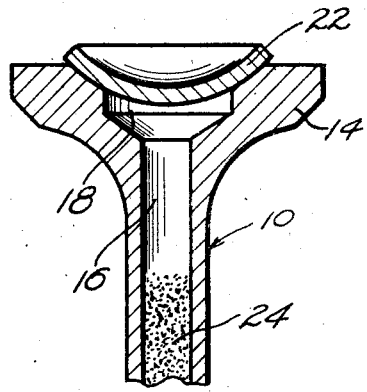
Fig_2
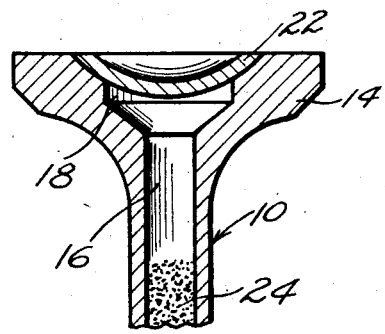
Fig_3
INVENTOR.
Joseph H. Hoern Patented Feb. 5, 1946

2,394,177

UNITED STATES PATENT OFFICE 2,394,177

COOLANT CONTAINED VALVE

Joseph H. Hoern, Birmingham, Mich., assignor to Eaton Manufacturing Company, Cleveland, Ohio, a corporation of Ohio Application May 13, 1944, Serial No. 535,456

5 Claims. (Cl. 123—177)

This invention relates to valves and more particularly to hollow, coolant contained valves for internal combustion engines.

Broadly, the invention comprehends the provision of a hollow, coolant contained valve having an opening in the head end of the valve and means sealing the opening so as to retain the coolant in the valve effective to withstand expansion of the valve without fracture to the seal.

Heretofore, hollow, coolant contained valves that have the coolant inserted through the head of the valve and sealed therein by other means have failed under operating conditions; wherein the valves in being subjected to high temperatures undergo an appreciable expansion and contraction. Inasmuch as no provision has heretofore been made between the plug or sealing means and the valve head to compensate for such expansion and contraction of the valve, fractures have occurred in the weld with the consequent loss of coolant and result in failure of the valve. The instant invention is directed at providing an economically constructed hollow, coolant contained valve void of all deficiencies present in valves having other sealing means.

An object of the invention is to provide a head-sealed, hollow, coolant contained valve, said sealing means being economical and effective.

Another object of the invention is to provide a hollow, coolant contained valve having a thin, disk-like, oval-shaped plug secured in the head end of the valve for retaining the coolant in the valve, said plug being adapted to expand with the head of the valve when the valve is subjected to operating temperatures.

Another object of the invention is to provide a valve having a cavity in its stem and head, said cavity having an opening therein from the head end of the valve and means closing the opening so as to seal a coolant agent within the valve, said means being adapted to permanently and perfectly seal the coolant agent in the valve during all conditions to which the valve is subjected.

A further object of the invention is to provide a valve having a head and stem cavity open at the head end of the valve and a curved plug secured to the head of the valve closing the opening in the valve.

A still further object of the invention is to provide a valve having a partial cavity in the stem of the valve communicating with a cavity in the head of the valve, an opening in the head of the valve communicating with the head cavity, a coolant agent in the cavities, and a curved, resilient plug welded over the opening adapted to permanently and perfectly seal the coolant agent within the valve.

And yet, a further object of the invention is the provision of a method of manufacturing a hollow, coolant contained valve comprising forging and machining the valve to substantial completion so as to provide a body and head cavity and an opening in the head communicating with the cavity; inserting a predetermined amount of coolant agent into the cavity; and welding a curved plug on the head of the valve so as to seal the coolant within the valve, said plug adapted to expand and contract proportionately with the head of the valve under all conditions to which the valve is subjected so as to retain its weld with the head of the valve and thereby permanently and perfectly seal the coolant agent within the valve.

Other objects and advantages of the invention will appear from the following description taken in connection with the drawing, forming a part of the specification; and in which:

Figure 1 is a longitudinal cross sectional view of a substantially completed valve and a plug adapted to be secured in the opening of the valve;

Figure 2 is a fragmentary longitudinal cross sectional view of the valve after the insertion of a coolant agent into the valve and a welding of the plug on the head of the valve; and Figure 3 is a fragmentary longitudinal cross sectional view of the head of the valve after the completion of the machining operations thereon.

In the production of hollow, coolant contained valves, it is the practice to construct a valve so as to provide a cavity which is adapted to be partly filled with a coolant agent for the purpose of conducting heat from the head of the valve to the end of the stem for effective dissipation therefrom. Through the use of a coolant contained valve, especially where the valve is employed to control the exhaust of the engine, the valve will operate at a comparatively cool temperature and thereby provide more efficient operation of the engine.

Any suitable coolant agent may be used such, for example, as sodium or potassium salt which possesses a melting temperature well below the working temperature of those portions of the valve with which it comes in contact.

It has been found that the most practical and economical manner of making a hollow poppet valve is to machine or otherwise fabricate the valve with the opening into the valve cavity on the head end of the valve. In this way the swaging and plug sealing stems previously necessary upon the stem end of the valves, wherein the opening was provided at the stem end of the valves, subsequent to the machining or provision of the valve cavities are eliminated with a resultant reduction in overall cost of producing a hollow valve.

Furthermore, it has been found desirable and important that the coolant agent be permanently sealed within the valve so that at average operating temperatures of about 1100° F. to which the valve is subjected, wherein the head expansion of the valve is in the proportion of .006 inch per inch of valve diameter, no loss of the coolant agent will occur. Accordingly, the invention which will now be described provides for the effective sealing of the coolant agent within the valve wherein means are provided in the sealing means to compensate for the expansion and contraction of the head of the valve and thereby prevent fracture of the seal.

Referring now to the drawing for more specific details of the invention, 10 represents generally a valve comprising a stem 12 and an enlarged mushroom-shaped head 14, integral with the stem 12. The stem and head being provided with a central cavity 16 communicating with an opening 18 on the head end of the valve terminating in a straight chamfer 20; the purpose of which will hereinafter appear.

A curved or other suitably shaped, somewhat resilient plug 22, as shown in Figure 1, is adapted to be welded to the head of the valve in concentric relationship thereto.

In the construction of the valve in accordance with the teachings of the invention, the valve is either forged or cast and then machined to configuration, as shown by Figure 1, wherein, should the valve be forged, the machining operation to provide the cavity 16, opening 18, and straight chamfer 20 would be performed through the head of the valve and thus eliminate the difficulties coincident with machining through the stem of the valve. Furthermore, the access to cleaning the cavity in the valve would be far better inasmuch as the opening 18 can be made larger than the maximum diameter of the stem. After the valve has assumed the status as shown in Figure 1, wherein the cavity has been polished and thoroughly cleaned, a coolant agent 24 is inserted into the cavity so as to partially fill it.

The plug 22 is then placed upon the head of the valve with the convex portion thereof inserted in concentric relationship in the opening 18. In this position the convex surface of the plug has an annular line bearing with the chamfer 20 preferably the midpoint of the chamfer. Plug 22 is next secured to the head 14 by electrical resistance or any other suitable welding method. It is to be observed because of the structural nature of the plug that the welding electrode can be nestled in the plug concavity and thereby provide a uniform current distribution to and through the wall of the plug so as to effect an efficient weld throughout the chamfered surface. During the welding process the initial bonding of the plug upon the chamfer surface of the valve occurs along the line of initial contact between the plug and valve and flows therefrom progressively in both directions thereby effecting a high efficient bonding of the plug and valve over an area greater than the wall thickness of the plug.

For best results the chamfer width is made sufficiently greater than the plug thickness so as to provide a weld area between the plug and valve approximately four times the cross sectional annular area of the plug at the inner circumference of the weld. The flexing or resilient qualities of the plug compensate for the fourfold strength of the weld thereby making the plug and weld strength about equal.

Because of the curved nature of the plug and efficient weld thereof to the valve, the plug is adapted to assume a somewhat flattened condition upon heat expansion of the valve when operating under temperatures of, say, between 1000° F. and 1400° F. and thus reduces the strains upon the weld so as to prevent rupture thereof. By so reacting to the expansion of the head of the valve, the plug assumes the role of expansion compensator therefor, and although shown and described as being curved, it is to be readily realized that many similar shapes of plugs inserted and welded in a like manner could just as effectively serve the purpose herein effected by plug 22.

While this invention has been described in connection with certain specific embodiments, the principle involved is susceptible of numerous other applications that will readily occur to persons skilled in the art. The invention is, therefore, limited only as indicated by the scope of the appended claims.

What I claim is:

1. An engine valve comprising a stem having a hole extending inwardly from the head thereof and terminating a substantial distance from the opposite end, a head formed integrally with the stem having a cavity communicating with the hole, and a chamfer on the head adjacent the cavity, a coolant agent partially filling the hole, and a curved hollow plug of substantially uniform thickness having a portion of its convex surface welded upon the chamfer, thereby providing a plug thickness across the weld area substantially equal to the thickness of the plug.

2. An engine valve comprising a stem having a hole extending inwardly from the head thereof and terminating a substantial distance from the opposite end, a head formed integrally with the stem having a cavity communicating with the hole and a chamfer on the head adjacent the cavity, a coolant agent partially filling the hole, and a curved hollow plug of substantially uniform thickness having a portion of its convex surface welded upon the chamfer, thereby providing a plug thickness across the weld area substantially equal to the thickness of the plug, said plug having its annular base machined flush with the top of the valve.

3. An engine valve comprising a stem having a hole extending inwardly from the head thereof and terminating a substantial distance from the opposite end, a head formed integrally with the stem having a cavity communicating with the hole and a chamfer on the head adjacent the cavity, a coolant agent partially filling the hole, and a curved hollow plug of substantially uniform thickness having a portion of its convex surface welded upon the chamfer, thereby providing a plug thickness across the weld area substantially equal to the thickness of the plug, said width of the weld is not less than the thickness of the plug.

4. An engine valve comprising a stem and a head formed integrally therewith having a cavity extending inwardly from the head thereof and terminating a substantial distance from the opposite end of the valve, said head of the valve having a chamfer adjacent the cavity, a coolant agent partially filling the cavity, and a curved hollow plug of substantially uniform thickness having a portion of its convex surface welded upon the chamfer, thereby providing a plug thickness across the weld area substantially equal to the thickness of the plug.

5. An engine valve comprising a stem and a head formed integrally therewith having a cavity extending inwardly from the head thereof and terminating a substantial distance from the opposite end of the valve, said head of the valve having a chamfer adjacent the cavity, a coolant agent partially filling the cavity, and a cup-shaped plug of substantially uniform thickness having a portion of its outer surface welded upon the chamfer, thereby providing a plug thickness across the weld area substantially equal to the thickness of the plug.

JOSEPH H. HOERN.